E. C. Hubbard,
Brick Machine.
No. 111,210.   Patented Jan. 24, 1871.
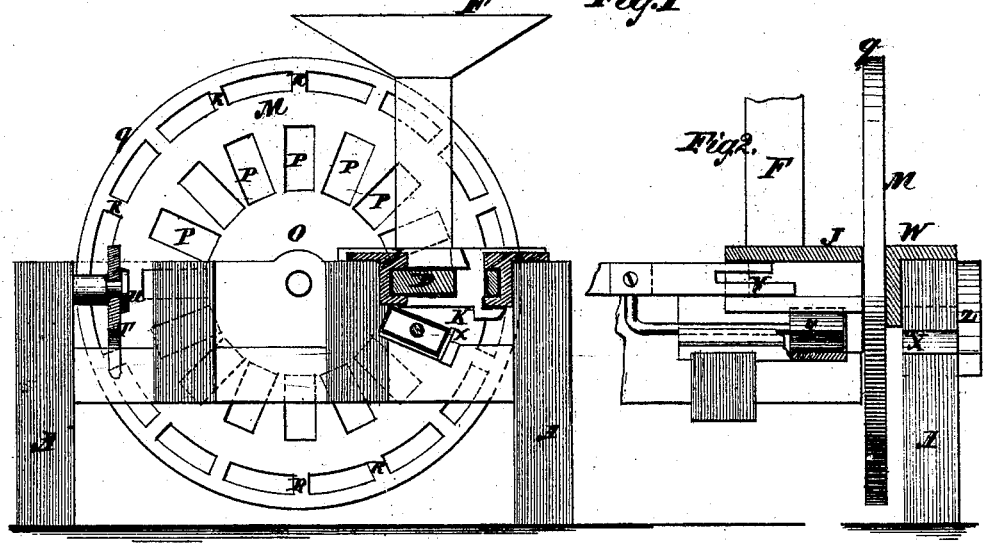
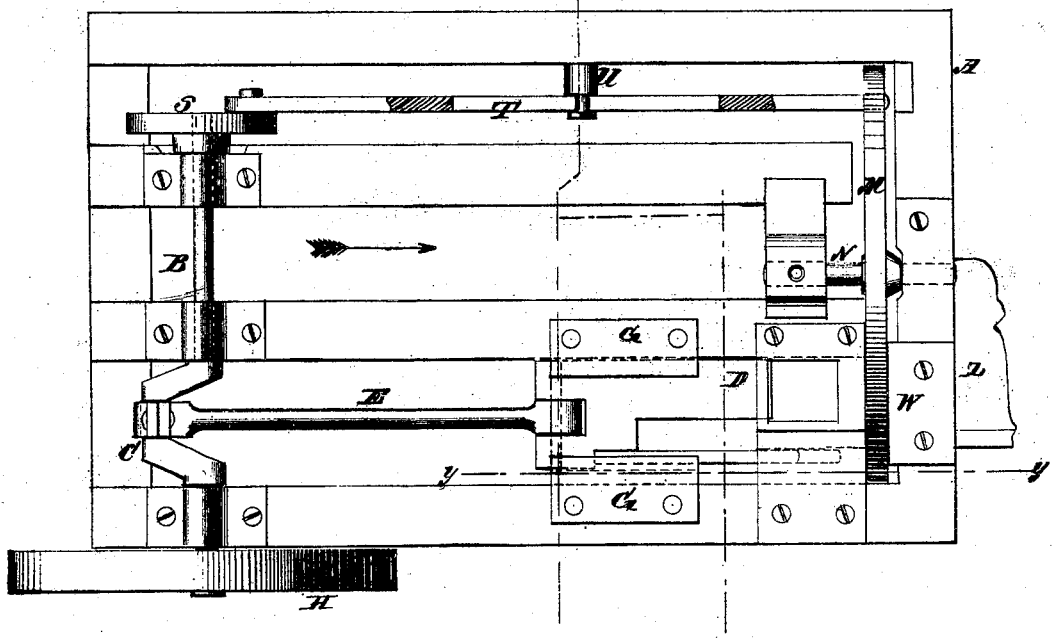

United States Patent Office.

ERWIN C. HUBBARD, OF GREEN BAY, WISCONSIN.

Letters Patent No. 111,210, dated January 24, 1871.

IMPROVEMENT IN BRICK-MACHINES.

The Schedule referred to in these Letters Patent and making part of the same.

*To all whom it may concern:*

Be it known that I, ERWIN C. HUBBARD, of Green Bay, in the county of Brown and State of Wisconsin, have invented a new and useful Improvement in Brick-Machines; and I do hereby declare that the following is a full, clear, and exact description thereof, which will enable others skilled in the art to make and use the same, reference being had to the accompanying drawing forming part of this specification.

This invention relates to new and useful improvement in machines for manufacturing brick, whereby strength, simplicity, and effectiveness are combined; and It consists in the construction and arrangement of parts hereinafter described.

In the accompanying drawing—

Figure 1 represents a vertical cross-section of the machine, looking to the right from the line $x\ x$ of fig. 3.

Figure 2 is a vertical section of fig. 3 taken on the line $y\ y$.

Figure 3 is a top or plan view.

Similar letters of reference indicate corresponding parts.

A is the frame, of either wood or metal, rectangular in form, by which the operating parts of the machine are supported.

B is the driving-shaft, upon which is formed a crank, C.

D is the plunger, which is given a reciprocating motion from the crank by means of the pitman E. This pitman is connected with the crank and with the plunger in a manner similar to the connection of a connecting-rod with the crank and cross-head of a steam-engine.

F is the hopper.

G G are the ways or guides in which the plunger slides.

H is a fly-wheel on the end of the driving-shaft.

The plunger works between the two horizontal plates J K.

The upper plate J has an opening, over which the hopper F is set, and through which the clay drops in front of the plunger.

Beneath the plate J is a right-angled cavity, as wide and as deep as the brick is long and thick, or the size of the plunger.

M is the mold-wheel, which is hung on the horizontal shaft N.

O is the center of the wheel, radiating from which, as seen in fig. 1, are the brick-molds, P, each representing the length and breadth of a brick, while the thickness of the wheel governs the thickness of the brick.

Q is the outer rim of the wheel.

R are short arms, one for each mold.

S is a crank-wheel on the end of the driving-shaft B.

T is a slotted lever, attached at one end to the wheel S by a wrist-pin.

U is the fulcrum-pin of this lever. As the main shaft revolves this lever receives a rocking longitudinal motion on its fulcrum-pin by means of the slot, while its end engages, at each revolution of the wheel, with one of the arms R, by means of which the mold-wheel receives an intermitting revolving motion.

The throw of the end of the lever is just sufficient to give the mold-wheel one-sixteenth of a revolution when there are sixteen molds in the wheel, as in the drawing, or a proportional distance for any other number of molds. Each of the molds in the wheel is thus brought directly in front of the plunger.

V is a fork, which is attached to and moves forward of the plunger, which catches the arm R opposite the mold, and holds the mold-wheel steady and in the right position as the plunger moves up and forces the clay into the mold.

W is a right-angled plate, attached to the frame as seen in fig. 3, one wing of which extends down, as seen in fig 2, and serves as an abutment, against which the clay is pressed. The mold-wheel revolves in contact with this plate, and the end of the plunger works up to the other side of the wheel, so that, when the plunger recedes, the brick has been pressed into and is left in the mold until the lever engages with another arm and turns the wheel so as to bring another mold in place. The mold which has been filled is by this motion carried down opposite the delivery-aperture $x$, fig. 1, and is pushed out of the mold by a plunger, $y$, which is attached to and moves with the main plunger. The bricks are thus delivered onto the apron $z$, from whence they are removed in the ordinary manner.

It will be seen that no cog-wheels or belts are used in the construction of this machine. Every part is strong and simple, and the power is applied in a direct manner. The plunger and the lever T work alternately, so that the whole power is employed for pressing the brick or driving the plunger.

The advantages of this mode of constructing brick-machines over the complicated and costly machines now in use are many and obvious.

Having thus described my invention,

I claim as new and desire to secure by Letters Patent—

1. The mold-wheel M, plungers D and $y$, and the fork V, constructed, arranged, and operating in combination substantially as and for the purposes herein shown and described.

2. The lever T and the mold-wheel, when combined and operating substantially as set forth.

ERWIN C. HUBBARD.

Witnesses:
G. E. T. KYBER,
FREDREK SCHELLER.